Oct. 29, 1946.  Z. W. CRAINE  2,410,338
SILO
Filed Oct. 27, 1942  2 Sheets-Sheet 2
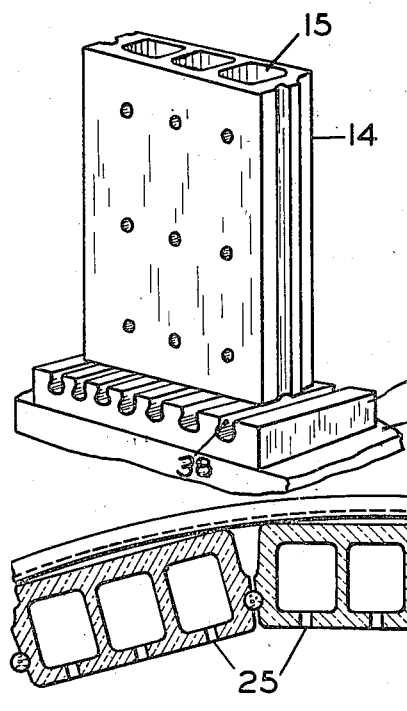
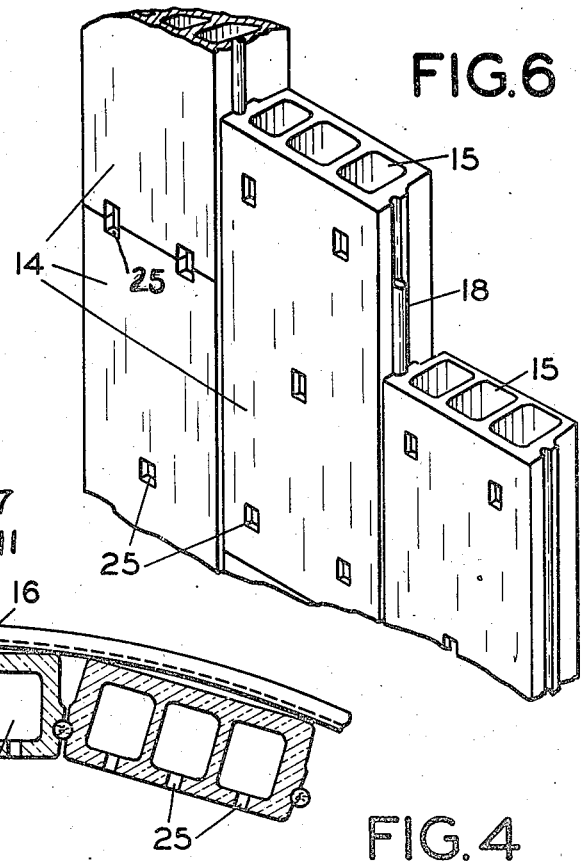
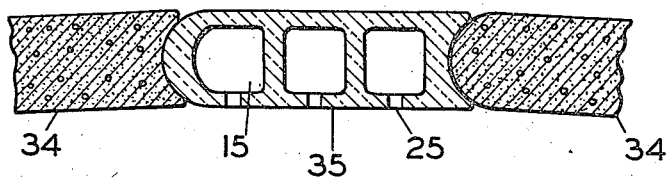
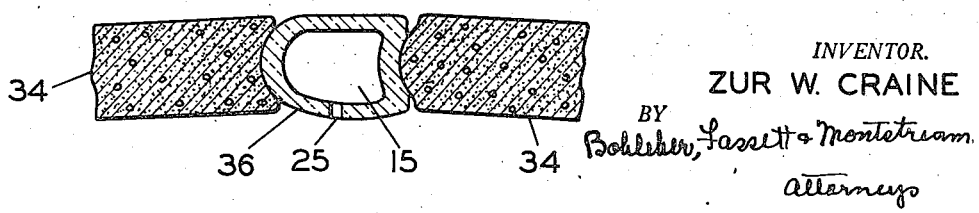
INVENTOR.
ZUR W. CRAINE Patented Oct. 29, 1946

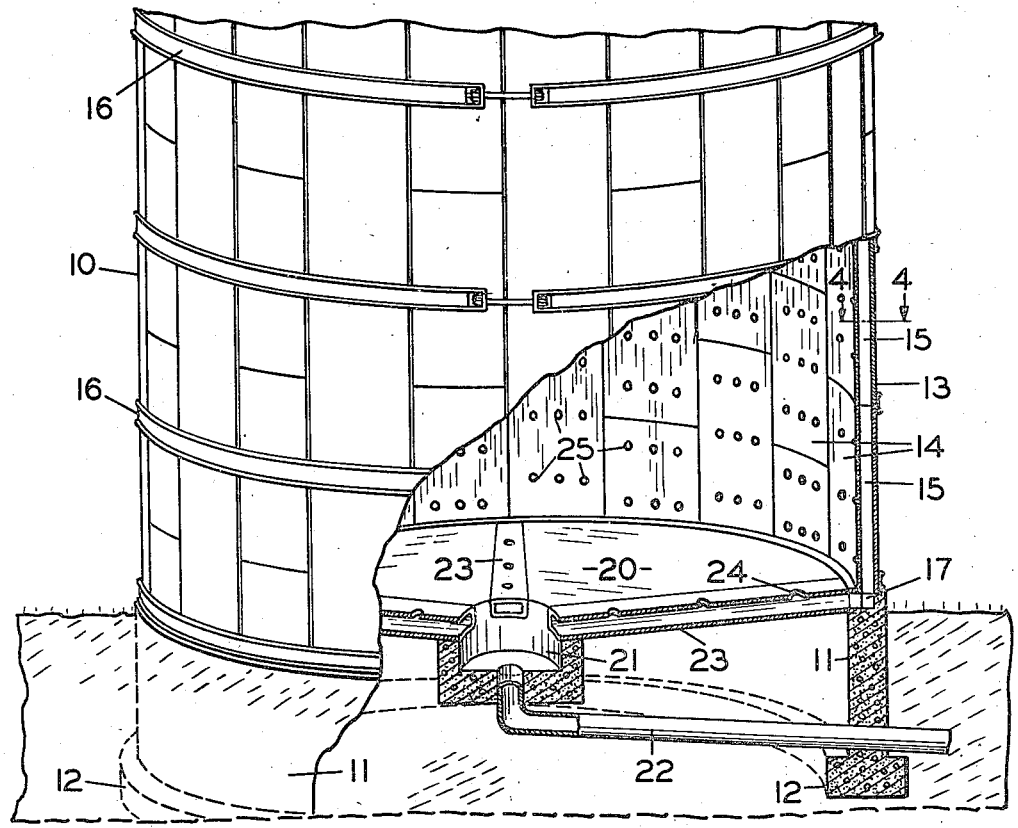
FIG.1
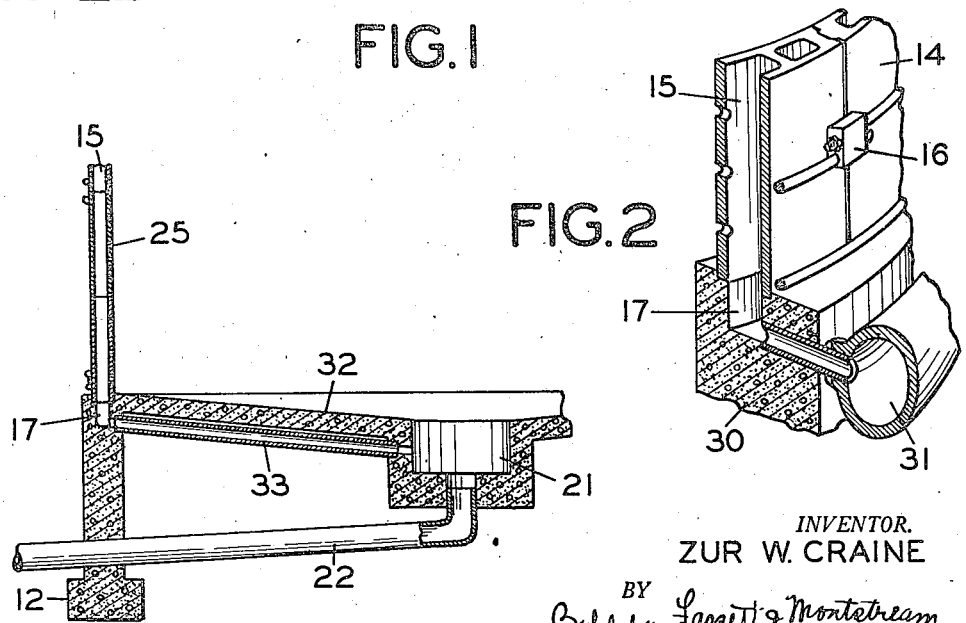
FIG.2
FIG.3
INVENTOR.
ZUR W. CRAINE

2,410,338

UNITED STATES PATENT OFFICE 2,410,338

SILO

Zur W. Craine, Norwich, N. Y., assignor to Craine, Inc., Norwich, N. Y., a corporation of New York Application October 27, 1942, Serial No. 463,501

2 Claims. (Cl. 72—6)

This invention relates to improvements in the construction of farm silos of the tower type as distinguished from stack silos and trench silos.

More particularly, my invention relates to improvements in means for draining tower silos which are designed and adapted for the proper storage and curing of green silage crops having both a high moisture content and a tendency to become packed down or firmly matted together when the same is stored therein in large quantities, such for example as grass silage.

Until grass and other silage of a high moisture content came to be used no serious difficulty was experienced in making tower silos at a cost which the farmer could profitably pay for storing such forage crops. While occasionally there occurred an objectionable seepage through the joints in the walls of such silos of the juices and other moisture therein, this did not present a real structural or economic problem such as it does now in the case of providing silos suitable for the storage and curing of green grass silage.

Because of the comparatively low moisture content and other physical properties of corn silage and the like, it has all along been possible to construct economically a tower silo for such use which would nevertheless be sufficiently strong and suitable to withstand without excessive leakage the semi-hydrostatic pressures to which the walls and joints of said silos were subjected while in use. The nature of such economies are easily recognized when it is realized that a tower silo is not constructed or intended to serve as a water tank. When however, it was desired to store and cure green grass silage in a tower silo of the class described herein, it was discovered that free liquid pressure developed therein and increased to almost hydrostatic proportions, thereby requiring heavy additional steel reinforcing, yet greatly increasing the tendency to leakage and further, this excess moisture resulting in silage of inferior quality.

An important object of my invention is, therefore, to provide a tower silo for the storage and curing of high moisture content forage crops without appreciably increasing the cost of labor and material.

An important object of my invention is, therefore, to provide a tower silo for the storage and curing of high moisture content green forage crops with self-contained means built therein for reducing such high moisture content to around the preferred normal good silage requirements of about seventy per cent, thereby reducing pressures and conserving critical extra reinforcing metals without appreciably increasing the cost of labor and/or materials.

A further object of my invention is to provide in combination with a tower silo and preferably when the same is initially constructed, a drainage means which will efficiently and effectively dispose of the excess moisture ensiled with such forage crops.

Other objects and advantages of my invention will either become apparent or be more specifically referred to in the following description thereof, written in connection with the appended drawings illustrating a preferred embodiment thereof, and in which, Figure 1 illustrates in perspective the lower portion and foundation structures of a tower silo constructed in accordance with the teachings of my invention, and having a portion thereof broken away to show details of its construction.

Figures 2 and 3 illustrate modifications of portions of the structure shown in Figure 1.

Figure 4 is a fragmentary sectional plan view of the wall structure of a silo embodying my invention taken on line 4—4 of Figure 1 and looking in the direction of the arrows.

Figures 5 and 6 show details of the material used in the construction of the device shown in Figure 1.

Figures 7 and 8 show fragmentary sectional plan views of modified forms of wall structures which may also be employed in the construction of silos of the class described.

Referring now to the drawings, and particularly to Figure 1, my tower silo is indicated generally by the numeral 10. It will be seen that the same preferably comprises a cylindrical foundation 11 constructed of concrete, masonry, brick or any other suitable material erected upon any suitable footing 12. The central or body portion of the silo 10 is erected upon the foundation 11 and preferably comprises a wall structure 13 built up of a suitable type of hollow pre-formed building blocks 14 laid in tiers on and around the foundation 11 with the hollow portions 15 thereof disposed in vertical alignment. Preferably the blocks 14 are laid so that the joints in one vertical tier will be spaced or disposed between, or break, the joints between the blocks of an adjacent tier. It will be understood that care is used so that the mortar, caulking, joint filler and/or gaskets used in these tier joints does not clog the hollow portions 15.

As the walls of the silo are so constructed any suitable means may be used for setting together or joining the block of adjacent tiers such as making these joints of mortar, joint filler, caulking and/or gaskets, cement, or if desired, adjacent tiers of blocks may be keyed together in any other well known manner, such as indicated at 18 in Figure 6. Tiers of blocks progressively so constructed and positioned are held firmly in place by a plurality of spaced hoops or bands 16, disposed about the same and tensioned in the usual way to add the stiffening necessary for a structure of this sort. Finally, it will be understood that this cylindrical wall structure may be built up to any height and capped with any suitable form of roof or cover, not shown. In my silo thus constructed it will be seen that throughout the height of the body portion forming the side walls thereof a plurality of openings 15 are formed by the end-to-end disposition of the hollow blocks 14 above described. The top of the foundation 11 is constructed to form an annular recess 17 so positioned that when the wall blocks 14 are erected upon said foundation the vertical wall openings 15 above described will register with said recesses 17.

In the form of the silo here shown a floor 20 of inverted conical form is constructed, having at the center thereof a sump 21 into which surface liquid from the floor of the silo will drain, and from which said liquid is conducted by means of a pipe 22 and permitted to drain off into the ground or otherwise be suitably disposed of. Extending radially from the sump 21 to the foundation, as shown, I provide a plurality of hollow drain tiles 23 having their inner ends in communication with said sump and their outer ends in communication with the vertical openings 15 in the side walls of the silo 10 through the medium of the annular recesses 17. Also, the tiles 23 may be provided, if desired, with openings 24 into which surface water from the floor of the silo may drain.

In each of the building blocks 14 used in the construction of my new silo are formed one or more openings or weep holes 25 extending from the inside surface of said block to the vertical openings 15 therein through which juices and other moisture is adapted to drain from the silage stored therein down through the openings 15, the recesses 17 and to the sump 21. These openings 25 may be of any suitable size or shape, such as the round holes shown in Figure 5, or the rectangular openings shown in Figure 6. It will also be understood, as shown in Figure 6, that sections of the openings 25 may be constructed at the ends of the blocks so that the openings or weep holes 25 are formed, if desired, at the joint between superimposed blocks.

My invention therefore comprises the construction of a tower silo having in combination drainage inlets located at various points and preferably at different elevations on the inside surfaces of the silo wall and extending from the said interior surface to the founation thereof downwardly through the inside of the walls so that juices and other silage moisture may drain off from the silage at any one of a plurality of levels, and be conducted to the foundation and there suitably disposed of.

Figure 2 illustrates a modification of the manner in which moisture may be conducted by means of a plurality of pipes 30 leading from the recess 17 and empty into a ring of farmer's drain tile 31 disposed outside of the foundation.

Figure 3 shows a further modification of a foundation drainage structure comprising a solid concrete floor 32 under which is laid a plurality of radially disposed drain pipes 33 connecting the recess 17 with the sump 21.

Figures 7 and 8 illustrate modifications of wall structures which may be used in the construction of silos embodying my invention and in which tiers of suitably shaped solid preformed concrete sections or blocks 34 are used in combination with hollow tile or other blocks 35 or 36 of insert material having a suitable cross-sectional structure, yet different from that shown in Figure 4.

In Figure 5 I illustrate a further modification of the manner of erecting a silo embodying my invention in which a sectional block 37 made up in the form of a piece of tile or brick may be used by being placed on top of the foundation 11 and under the first course of silo stave or block units 14, instead of the annular recess 17 above described. These blocks 37 are formed with suitable holes or recesses 38 so that the openings 15 in the silo wall communicate with the recesses 38 and in turn permit liquid to drain from the walls to either the outside or inside of the silo, as desired, by merely plugging up the recess at one side or the other. When such a construction is employed the drainage will be to the inside of the silo only when the outside portions of the holes 38 are plugged or when the inside portions of the holes are plugged drainage will be outwardly.

While I have now described what seems to be a preferred embodiment of my invention, it is conceivable that various modifications in the configuration, composition and disposition of the component elements making up the same as a whole, may occur to those skilled in the art as a result of my teachings here. Accordingly, no unnecessary limitation of my invention is intended by the phraseology of the foregoing description or the illustration of said preferred embodiment.

What is claimed is:

1. A tower silo comprising a foundation having a grooved surface at least at the periphery of the foundation to form liquid outlet means, a body erected in the form of a wall upon said foundation and over the grooves to form an enclosure for silage thereabove, the wall being narrower than the grooved surface and located with respect thereto so that the ends of the grooves are exposed at the inner and outer faces of the wall to form liquid drainage outlets, the wall being of vertical sections a plurality of which have liquid drainage inlets communicating with the interior of the wall of said enclosure at different elevations, passage means within the wall leading from said inlets to said liquid outlet means, means interlocking adjacent sections together, and means for draining away from said foundation liquids conducted to said outlet means from different elevations within said silo.

2. A tower silo comprising a founation having a grooved surface at least at the periphery of the foundation to form liquid outlet means to the exterior of the silo wall, a body erected in the form of a wall upon the grooved surface of the foundation and forming an enclosure for silage thereabove, and the wall being narrower than the grooved surface and located with respect to the grooves so that the ends thereof are exposed at the inner and outer faces of the wall thereby forming a plurality of liquid drainage outlets communicating with the interior of the wall of said enclosure.

ZUR W. CRAINE.